March 6, 1934.  R. SIMPSON  1,949,634
RADIO TESTING APPARATUS
Filed April 13, 1932   5 Sheets-Sheet 1

Inventor:
Ray Simpson
By Williams, Bradbury,
McCaleb & Hinkle
Attys.

March 6, 1934.  R. SIMPSON  1,949,634
RADIO TESTING APPARATUS
Filed April 13, 1932   5 Sheets-Sheet 2

Inventor:
Ray Simpson
By Williams, Bradbury,
McCaleb & Hinkle
Attys.

March 6, 1934.  R. SIMPSON  1,949,634
RADIO TESTING APPARATUS
Filed April 13, 1932   5 Sheets-Sheet 3
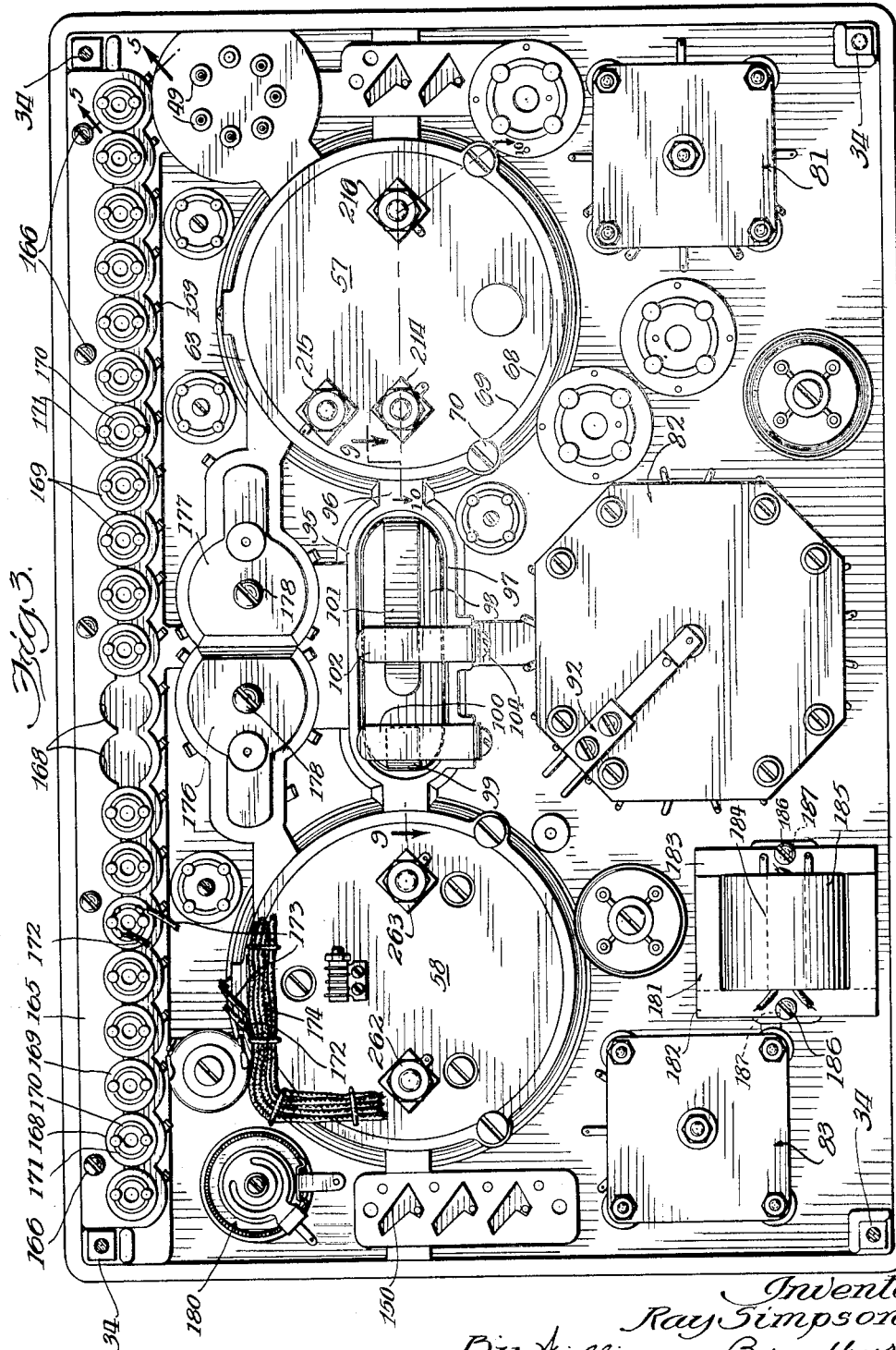
Inventor:
Ray Simpson
By Williams, Bradbury,
McCaleb & Hinkle
Attys.

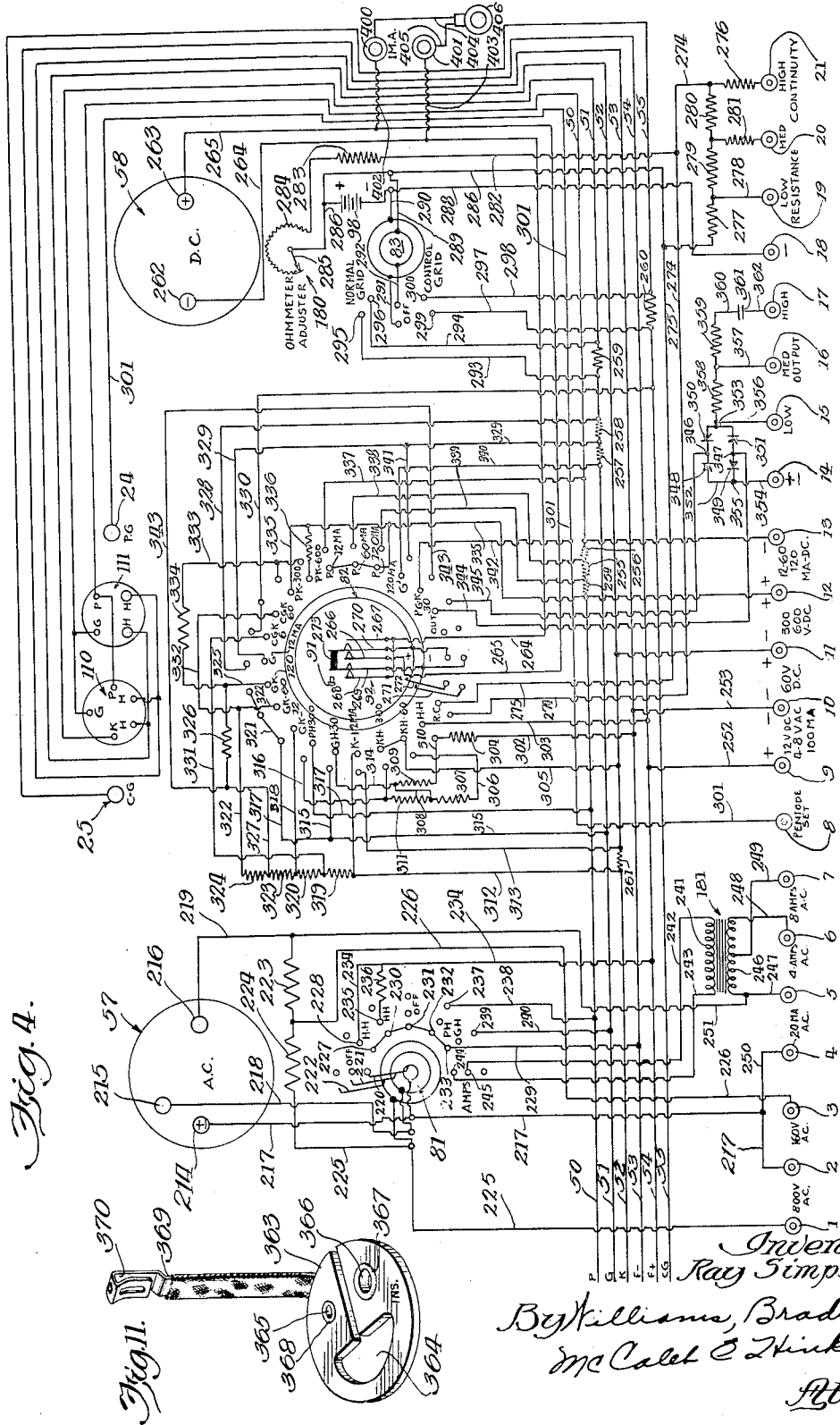

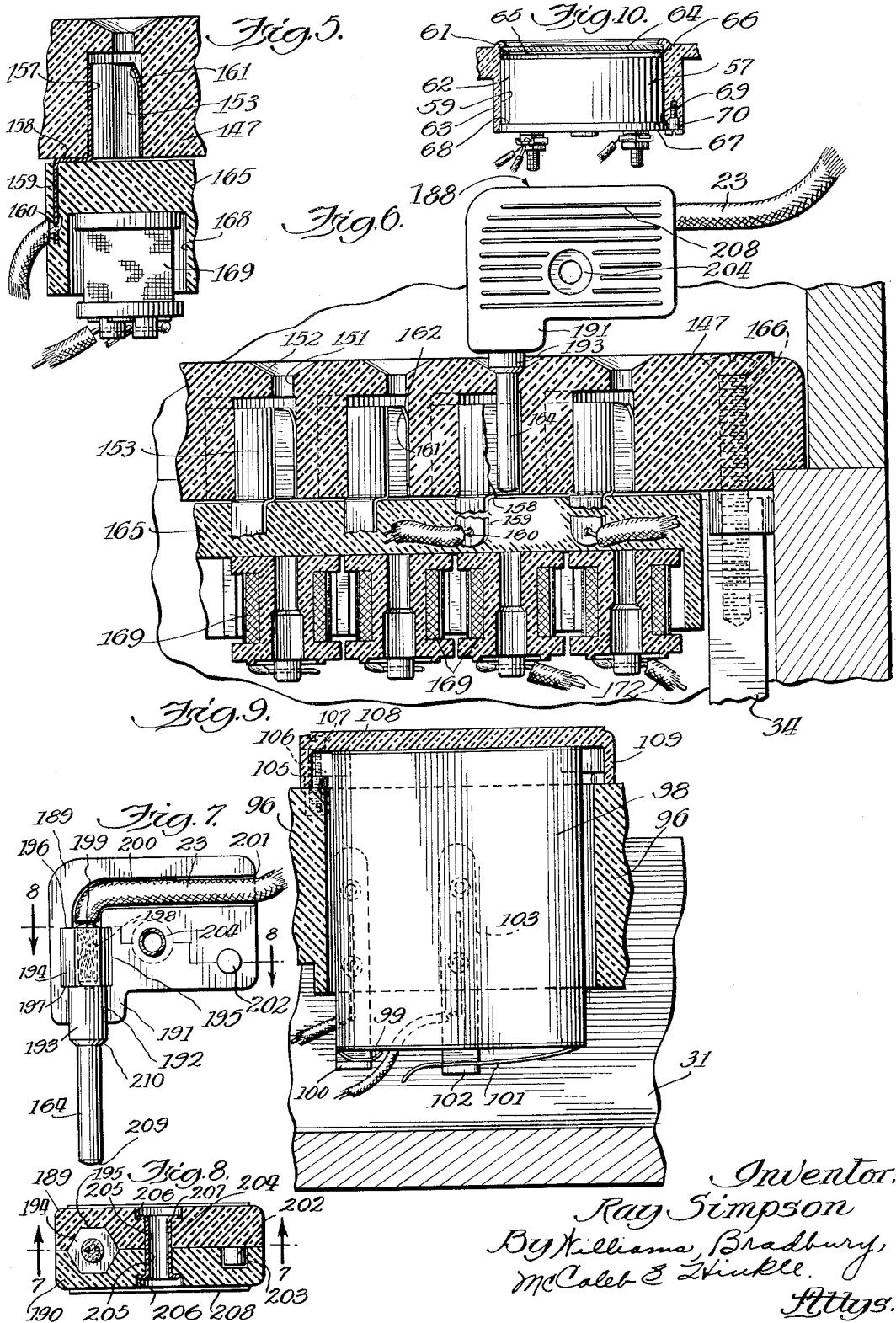

Patented Mar. 6, 1934

1,949,634

UNITED STATES PATENT OFFICE 1,949,634

RADIO TESTING APPARATUS

Ray Simpson, River Forest, Ill., assignor to Jewell Electrical Instrument Co., Chicago, Ill., a corporation of New Jersey Application April 13, 1932, Serial No. 604,962

2 Claims. (Cl. 250—20)

The present invention relates to improved testing devices particularly adapted to be used in testing modern radio receiving sets, amplifiers, tubes and other radio apparatus, but the present testing device may also be used for servicing or testing electrical apparatus of all kinds.

The present apparatus is particularly adapted to be used in testing all types of modern radio tubes and radio circuits and for determining the electrical conditions of voltage or current in the circuits of radio receiving sets, for comparison with standard charts of the normal conditions in any particular set.

One of the objects of the invention is the provision of an improved testing device of the class described, which is adapted to effect a test of all types of modern radio tubes, including screen grid and pentode tubes.

Another object is the provision of an improved testing device for radio receiving sets, which is adapted to be used in carrying out the testing of the set more expeditiously and efficiently, and which is so constructed that there is little likelihood of any of a multiplicity of predetermined tests being omitted.

Another object is the provision of an improved testing device structure including a dry battery for resistance, continuity and tube tests, in which the battery is readily accessible for test or removal, so that the testing device may be maintained at a high efficiency.

Another object is the provision of an improved panel structure, by means of which much of the labor and materials formerly necessary in constructing such a testing device, has been eliminated, and the parts of the testing device have been so reorganized and rearranged, that the device may be constructed more economically, and is capable of being maintained in a serviceable condition for a long period of time, without necessity for repair.

Another object is the provision of an improved panel and jack arrangement, which is uniformly adapted to be used either for ordinary jacks or for the contacts of sockets, thereby eliminating a large number of different kinds of parts which would otherwise be required to construct the complete testing device with jacks and sockets.

Another object is the provision of an improved jack tip or pin connector for the test leads of such a testing device, by means of which the kinking and twisting of the separate conductors is eliminated, and the life and usefulness of the conductors is extended.

Another object is the provision of an improved testing device of the class described, which is adapted to test the direct current voltage between the various contacts of a socket in a receiving set under operating conditions, irrespective of the polarity of the contacts.

Another object is the provision of a tester of the class described, which is adapted to be used in measuring the efficiency of the radio receiving set through a determination of the output, by means of an improved metering arrangement.

Another object is the provision of an improved testing device of the class described, which is adapted to effect a test of the resistance and heater center tap connection of tubes of the heater type.

Another object is the provision of an improved radio testing device, the structure of which is peculiarly adapted to facilitate the provision of an ownership name plate for every owner of a testing device.

Another object is the provision of an improved panel structure for radio testing devices of the class described, by means of which the various elements or electrical apparatus may be more conveniently associated with the panel and with each other, at a minimum amount of expense and labor.

Another object is the provision of an improved radio testing device of the class described, which is adapted to be used to effect the measurement of alternating currents with the same meter which is utilized for alternating current voltage measurements.

Another object is the provision of an improved radio testing device of the class described, which is adapted to effect a large number of different tests, utilizing a minimum number of different meters.

Other objects and advantages of the invention will be apparent from the following description, and from the accompanying drawings, in which similar characters of reference indicate similar parts throughout the several views.

Referring to the drawings, of which there are five sheets;

Fig. 3 is a bottom view of the panel of the present testing instrument, with all of the electrical apparatus shown, except the connecting wires;

Fig. 4 is a wiring diagram of the present testing device;

Fig. 5 is an enlarged sectional view through one of the connector jacks and resistance spool sockets, taken on the plane of the line 5—5 of Fig. 3;

Fig. 6 is an enlarged sectional view through one panel at a plurality of connector jacks and resistance spools, showing the jack tip or connector in elevation, and taken on the plane of the line 6—6 of Fig. 1;

Fig. 7 is a vertical, sectional view through one of the pin connectors for the test leads, taken on the plane of the line 7—7 of Fig. 8;

Fig. 8 is a transverse, sectional view through the same pin connector, taken on the line 8—8 of Fig. 7;

Fig. 9 is a sectional view taken through the battery casing, on the plane of the line 9—9 of Fig. 3;

Fig. 10 is a fragmentary, vertical, sectional view taken through that portion of the panel forming the instrument casing;

Fig. 11 is a perspective view of a flat fiber adapter.

Figure 1:
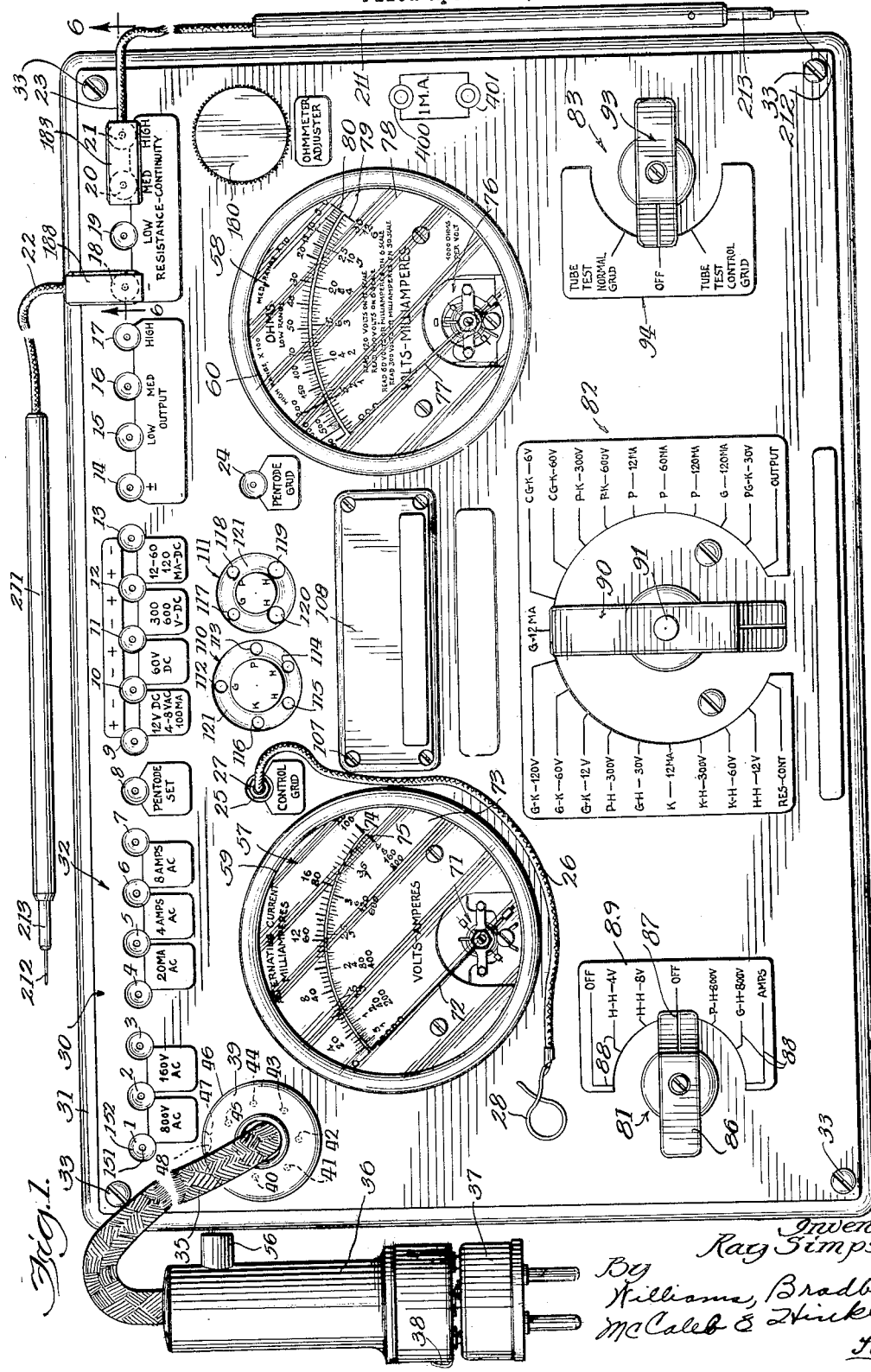
Fig. 1 is a plan view of the testing device constructed according to the present invention, showing the upper side of the panel instruments and certain accessories.

Referring to Fig. 1, the present testing device, which is indicated in its entirety by the numeral 30, is preferably included in a casing 31, the instruments and other apparatus being supported upon a panel 32 preferably of a molded phenolic condensation compound. The panel is secured in the casing by a plurality of screws 33, which pass through the panel 32 and are threaded into square studs 34 resting upon the bottom of the casing, and also secured to the bottom of the casing by screws.

The present testing device is preferably of the type which is provided with a cable 35 containing conductors which are connected to the contacts of a plug connector 36, adapted to be substituted for an audion tube in any of the sockets of a radio receiving set or other amplifier. The plug connector 36 is preferably of the type having five contact prongs corresponding to the contacts of the tetrode type of tube, but the plug 36 may be utilized with an adapter 37 in which the cathode contact is connected to one side of the filament, thereby transforming the plug 36 to a four prong connector plug. The adapter 37 is preferably fixedly secured to plug 36 by a latch actuated by thumbpiece 38, so as to eliminate the pulling apart of the plug and adapter when they are drawn out of a socket.

The cable 35 is preferably provided with a connection plug 39 of the female type, having contacts adapted to engage the contact prongs 40—45 carried by the panel 32. The panel 32 is provided with a depression or socket 46 for receiving the cylindrical contact plug 39, but the socket 46 is preferably provided with a rib 47 adapted to be received in a groove 48 in the plug 39 to assure the connection of the proper contacts of plug 39 with the prongs 40—45.

The contacts 40—45 comprise substantially cylindrical pins preferably formed with anchoring ribs 49, the pins projecting from the top and bottom of the panel and having their anchoring formations embedded in the molded material of which the panel 32 is constructed.

Referring to Fig. 4, the contacts of plug 36 and conductors in the cable 35 correspond to the plate lead 50, grid lead 51, cathode lead 52, filament minus lead 53 and filament positive lead 54. The plug 36 is also provided with a substantially cylindrical metallic connector 55 carried by the insulating body 36, and corresponding to the upper connector for the control grid of a screen grid tube, so that the plug 36 may be substituted for a screen grid tube. The control grid connector 55 is connected by control grid lead 56 to one of the contacts 40—45, so that all of the leads from the radio set to the testing device may be enclosed in the covering of a cable 35.

In order to eliminate the necessity for providing special casings for the electrical instruments 57, 58, the panel 32 is preferably formed with a pair of circular apertures 59, 60, bordered by an inwardly projecting flange 61. The structure of the panel for each instrument is the same, so that only one of the structures need be described in detail.

The meter 57 is provided with a transparent covering located in a cylindrical chamber 62 and engaging the inside of the integral annular flange 61. The chamber 62 may be formed by an integral downwardly projecting cylindrical flange or wall 63 adapted to act as a casing for the meter 59, and a non-shatterable glass 64, or other transparent covering may be secured in place by a metallic bezel ring having a flange 65 engaging the glass, and having a cylindrical flange 66 frictionally engaging the inside of wall 63.

The meter casing is completed by a disc 67 which is secured against an annular shoulder 68 inside a counter-bore 69 by a plurality of screw bolts 70 threaded into the molded insulating material.

It will thus be observed that with the present panel construction it is unnecessary to provide the usual casings for the electrical instruments, because the panel is provided with integral formations adapted to serve as an enclosure for the meter and the cost of the usual casings is thereby practically eliminated, since it costs very little more to form the socket for the meter in the integral body of the panel 32.

The present testing device is preferably provided with an alternating current meter 57 and with a direct current meter 58, both meters being essentially milliammeters, together with appropriate auxiliary devices for changing the range of these milliammeters to perform a great variety of different functions. Thus, the meter 57 is provided with a single movement 71 and a needle 72 cooperating with a dial 73, which has a pair of arcuate scales 74, 75.

The upper scale 74 is provided with indicia for reading alternating current milliamperes on a range of 0-20 m. a. and also on a range of 0-100 m. a. The lower scale 75 is provided with indicia for the reading of alternating current volts on ranges of 0-4 volts, 0-8 volts, 0-160 volts, and 0-800 volts A. C.

In a similar manner, the single movement 76 and pointer 77 of the direct current meter 58 are adapted to be used with dial 78, having a pair of different scales 79, 80. The upper scale bears indicia for resistance measurements in ohms on ranges of 0-1000, and also indicia indicating that the normal low range scale 80 may be used for a high range by multiplying by 100 or for medium range resistance measurements by multiplying by the factor 10.

The lower scale 79 of D. C. meter 58 has appropriate indicia for measurement of volts or milliamperes on scales of 0-6, 0-12, or 0-30, the scales being used interchangeably according to the indicia placed on the dial, as follows:

"Read 120 volts on 12 scale
Read 600 volts on 6 scale
Read 60 volts or milliamperes on 6 scale
Read 300 volts or milliamperes on 30 scale."

The panel 32 also preferably supports a plurality of selector switches 81, 82, 83, preferably of the rotary type, and the switches are preferably so connected to the circuit that each meter has its own rotary selector switch. Thus, the switch 81 is utilized for alternating current measurements and is associated with meter 57, the dial being provided with indicia for the off position and for appropriate positions for the measurement of heater voltages, plate to heater voltage, grid to heater voltage and amperes, all of which may be accomplished by means of a meter 57. The switch actuating member 86 has a line 87 adapted to register with any one of the radially extending lines 88 of the indicia 89.

The selector switch 82 is adapted to be used for controlling the connections of direct current meter 58 for measuring the direct current voltage of D. C. filaments, cathode to heater, grid to heater, plate to heater, grid to cathode, control grid to cathode, plate to cathode, and pentode grid to cathode. This selector switch is also used for current measurements such as cathode milliamperes, grid milliamperes, plate milliamperes, and also for resistance or continuity tests and output tests.

The actuating member 90 is similar in form to the one previously described, but is preferably provided with a push button 91 for controlling a plurality of resilient contacts of a reversing switch 92 carried by the bottom of the bank switch 82. It is thus possible to measure the direct current voltages enumerated, whether the voltages be positive or negative, because the connection of the meter 58 to the selector switch 82 may be reversed by means of the reversing switch 92, if necessary.

The selector switch 83 is similar in construction, being provided with an actuating member 93 and with indicia 94 for the off position or for test of a tube with a grid connected to the usual prong and a test of a tube with a grid connected to a cap at the top of the tube.

While the grids in both these types of tubes are "control" grids, it has become customary in the trade to refer to the grids which are connected to the usual prongs at the base of the tubes as "normal" grids and the grids which are connected to a cap at the top of the tube are referred to as "control" grids, and this terminology will be employed throughout the present specification and claims. Accordingly the jack 25 has been designated a "control" jack in Fig. 1, as it is intended to be used with grids connected to the cap at the top of the tube.

The selector switch 83 is preferably biased to its off position so that only momentary contact is made at either of the positions of the switch, and on release of the switch it returns to the position of Fig. 1. The details of these switching devices, per se, have been made the subject of a separate application for patent and they will not therefore be described herein.

The panel 32 is also preferably provided with a depending integral wall 95 of insulating material joined to the walls 63 of the instrument casings by a portion 96 at each end, and the wall 95 forms an oblong socket 97 adapted to receive a standard dry battery preferably of the type usually employed in flashlights. The dry battery 98 is provided with a relatively short contact 99 adapted to engage a connector contact 100, which projects across the bottom of the socket 97. The battery 98 is also provided with an elongated resilient contact 101 adapted to engage second connector contact 102 located midway between the ends of the battery socket 97 at its lower side.

Each of the connector contacts 100, 102, may comprise an elongated strip of metal provided with a main body 103 which is secured to the wall 95 by a plurality of screws 104 passing through apertures in the body and threaded into the insulating wall. Each of the contact connectors 100, 102 has its end bent over transversely to the body so as to project across the lower opening of socket 97 to prevent the dry battery 98 from falling through the socket and to effect connection with the terminals of the battery.

The panel 32 is also preferably provided with a plurality of metal lugs 105 embedded in the insulating body of the panel and provided with threaded apertures 106 for receiving the screw bolts 107. One of the threaded lugs 105 is preferably located at each corner of the socket 97 at the top of the panel and the socket 97 may be closed at the top by a molded insulated cover plate 108 of the same material.

The cover plate 108 is preferably formed with a depending wall 109 which is adapted to enclose the dry cell 98, and when the cover 108 is secured in place by screws 107, the contacts 99, 101 are forced into resilient engagement with the angular connectors 100, 102.

The cover plate 108 may be very conveniently removed whenever it is found that the dry battery 98 is low in voltage, so that the cell may be very conveniently replaced, and the testing device may be maintained at maximum efficiency and accuracy at all times, without the necessity for removing the panel.

The present arrangement also effects the electrical connection between the new dry battery and the circuits of the testing device with a minimum amount of effort, since it is necessary only to put the battery in the socket, and it is impossible to connect the contacts of the dry battery in the wrong way, because the connector 100 is located at one end of the socket, while the connector 102 is located at the middle, and if the cell were reversed, no connection would be made with the battery contact 99.

The cover plate 108 may also be used as an individual ownership plate by the owner of the testing device, bearing his name and address in the form of grooved indicia molded in the top of the cover plate, the grooves being filled with a material of contrasting color such as white engraver's wax. It would be impractical from a manufacturer's standpoint to mold any special name upon a molded panel, for the reason that every panel would have to have a special die or some special arrangement on the die, but it is advisable to make all of the panels alike and provide relatively small plate of blank form which may be exchanged for a specially molded name plate bearing the name of the owner, at a very low price. This practice also enables the manufacturer to keep track of the ownership of the testing devices which he manufacturers, and renders the most effective service to the owners of the instruments.

The present panel is preferably provided with a multiplicity of connector jacks which have been numbered 1 to 21. The jacks 1–21 are used with appropriate leads 22, 23 for connection of the testing device to external circuits for many different kinds of measurements, including the use of the meters 57, 58 for ordinary purposes on any of their ranges. When the meters are being used in this manner, the plug 39 should be disconnected from the panel and the selector switches should be turned to off position when the meters are being used externally through the jacks 1 to 7, and 9 to 13. It will be noted that jacks 1 to 7 bear indicia corresponding to the AC voltage ranges and the AC current ranges of the meter 57. The jacks 9 to 13 bear indicia corresponding to the DC voltage and current ranges of the DC meter 58, and the various ranges of the meters are directly connected to these jacks as indicated.

The jack 8 which is designated "pentode set" is intended to be used for special pentode tubes which have their suppressor grid connected to an auxiliary terminal usually on the side of the tube, and this jack is not used for standard pentode tubes. Standard pentode tubes merely have their suppressor grid connected to the midpoint of the filament inside the tube and do not have any external terminal connected to the suppressor grid. The auxiliary jack 24 which is designated "pentode grid" is used with a lead for connection to the grid of a standard pentode tube, while the jack 25 is used with a lead for connection to the control grid of any tube which has its control grid connected to some terminal such as the cap at the top of the tube, rather than the usual prongs.

The control grid lead 26 is provided with a pin connector 27 for engaging in the jack 25 and with a connector 28 at the other end adapted to engage the control grid connector on the upper end of a screen grid tube, which connector corresponds in shape to the connector 56 on plug 36.

It will thus be observed that screen grid tubes may be tested in the present device or receiving sets may be tested with screen grid tubes in operation, by placing the tube in the appropriate socket and effecting the other connections with the radio set by means of the connector 56, and with the top of the tube by means of the lead 26.

The jacks 14—17 are provided with appropriate indicia for the output test and comprise the common terminal and low, medium and high output terminals. When these jacks are used with appropriate leads, the rotary selector switch 82 should be turned to the output position.

The jacks 18—21 are used for resistance or continuity tests, in which case the DC meter 58 is placed in series with the standard cell 98 and the electrical circuit or apparatus under tests through the leads 22, 23, and in such case, the selector switch 82 should be turned to the RES—CONT. position.

The present panel is also provided with a pair of sockets 110, 111, each of the sockets being formed integrally with the panel 32. The socket 110 is a five hole socket, and is provided with apertures 112 to 116, corresponding to the grid, plate, two heater contacts, and cathode contact of a tetrode tube. The socket 111 is a four hole socket and for this purpose, the panel is provided with apertures 117—120 corresponding to the grid, plate and two heater contacts for the filament of a triode tube.

In order to facilitate the insertion of the contact prongs in the holes 112—120, each of the sockets 110, 111 is provided with an annular groove 121 located in the upper surface of the panel and joining the apertures. The annular grooves 121, are substantially semi-circular in cross-section and when the points of the contact prongs are placed in these grooves, it is a relatively simple matter to rotate the tube until the prongs fall into the proper contact holes. The circular groove guides the prongs into the proper path, but the prongs cannot go into the holes until the proper rotative position is reached, on account of the spacing or size of the prongs.

Figure 2:
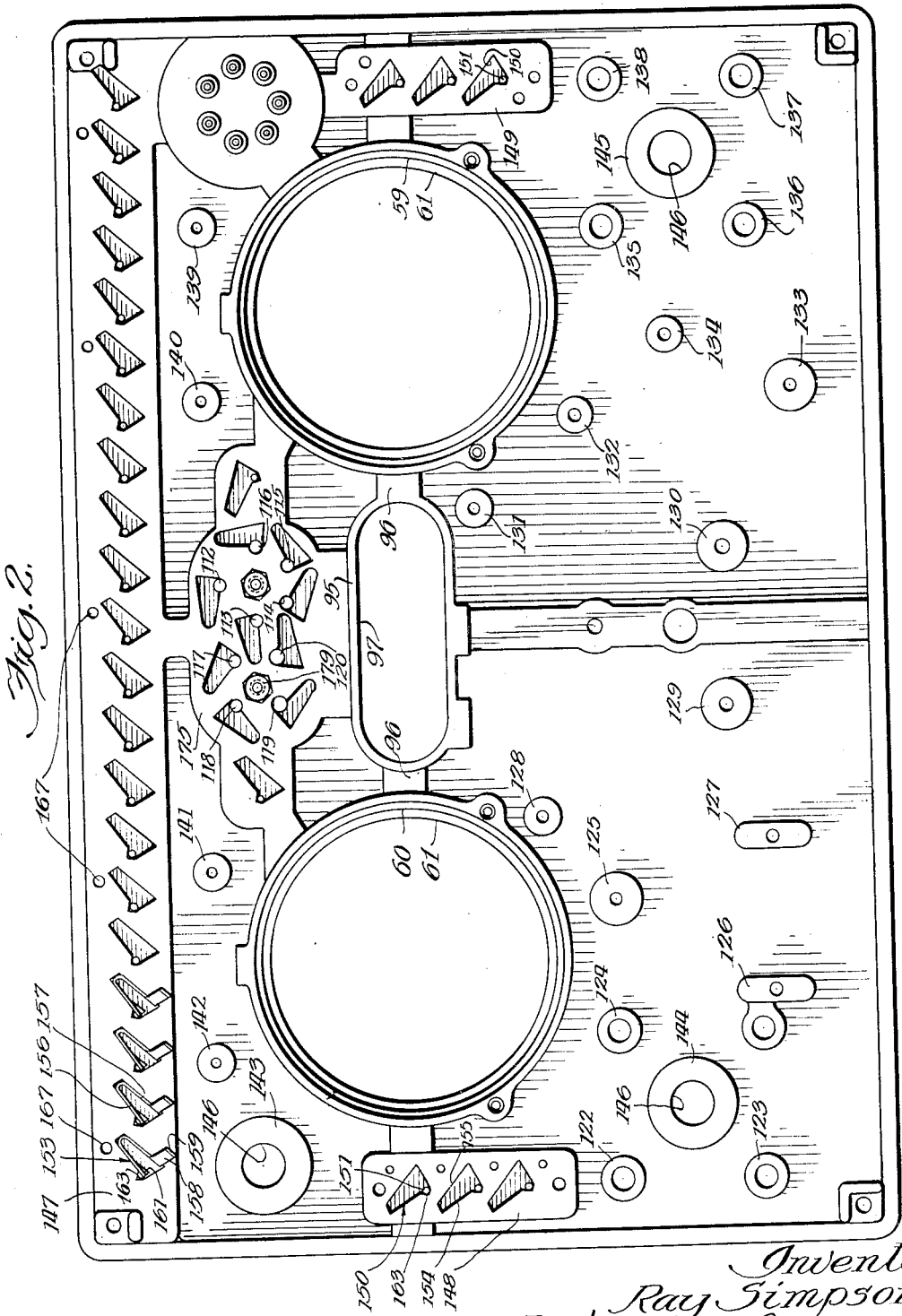
Fig. 2 is a plan view of the bottom of the panel after the panel has been molded, but not yet assembled with the electrical apparatus.

Referring to Fig. 2, this is a plan view of the bottom of a molded panel of the type utilized in the instrument of Fig. 1. Many of the features of construction of this panel have already been described.

The panel is preferably provided with a multiplicity of downwardly projecting lugs 122 to 142, of substantially cylindrical formation adapted to serve as supports for switches, resistance spools, transformers, rheostats, and the like. The apparatus may be secured by screws passing through the apparatus, threaded into apertures in the lugs 122—142, the lugs being themselves formed with threaded apertures, or having metallic threaded members embedded therein. Certain of the lugs 143—145 are provided with a centrally located bore 146 for receiving the shaft of the switch or rheostat.

The panel is also preferably provided with a relatively thick body 147 along its rear edge, and at any other points, such as 148, 149, adjacent each of the side edges of a panel, where it may be desirable to locate connector jacks.

The bodies 147—149 of integral molded phenolic condensation compound, are provided with a multiplicity of regularly spaced sockets 150 of substantially triangulalr shape in cross-section, each socket communicating with a substantially cylindrical aperture 151, which passes through the panel to the upper side. On its upper side, the panel is provided with frusto-conical formations 152 leading to the cylindrical apertures 151, and serving to guide the pin connector into the aperture 151 in effecting a connection.

The sockets 150 are suitably formed to receive jack springs 153 which are adapted to form the contacts for the various jacks, and also for the connector contacts of the sockets. The sockets 150 are thus preferably provided with a pair of substantially plane, vertical sides 154, 155, which are adapted to engage the legs 156, 157 of the jack springs 153. The jack springs 153 comprise strips of resilient sheet metal which are bent back to substantially U form, as shown in Fig. 2, and which are provided with integral, laterally, and upwardly extending portions 158, 159 having apertures 160 adapted to serve as connectors for the various wires, which are connected as previously described.

The leg 156 of the jack spring 153 has its upper corner 161 curved inward towards the other leg 157, forming a curved camming surface 162 (Fig. 6,) which is adapted to engage the end of a pin connector and permit the pin connector to cam the jack spring back as the pin connector enters.

The aperture 151 through the panel, is located at one side of the socket 150 and the socket 150 is provided with a corresponding recess 163 located outside the legs 156, 157 of the jack spring, so that when the pin connector is inserted through the hole 151, it engages the free leg 156 of the jack spring and resiliently urges the pin 164 against the wall of recess 163. The pin 164 is resiliently held by the walls of the recess and the jack spring 153. Jack springs 153 are of sufficient width so that they fit in the sockets 150, leaving a slight clearance above or below the spring, so that the parts of the spring may move freely, but they are held in place by a supporting plate 165 which may extend along the top of the bodies 147—149 to close all of the sockets 150.

The panel is thus provided with a multiplicity of different jacks, all of which have their connectors 159 projecting outward for connection to the various wires of the tester, and the jack springs are clamped in position between the body 147 of the panel and the supporting strip 165. The supporting plate 165 may also consist of a member molded of phenolic condensation compound having an upper flat surface for engaging the lower flat surface on the body 147 of the panel, and the plate 165 may be secured in place by screw bolts 166 passing through the plate and threaded into the apertures 167 in the panel.

In order to eliminate the necessity for a great deal of relatively fine work in connection with the securement of resistance spools which are necessary to change the range of the instruments, and to protect the various elements of the circuit, the plate 165 is formed with a multiplicity of cylindrical sockets 168 of sufficient depth to receive resistance spools 169. The resistance spools 169 are molded of the same material and provided with connectors 170, 171 at the top, communicating with the wires on the spool, and leads 172, 173 extend from each of the resistance spools to various parts of the circuit, such as the bus leads 174.

The various wires connecting with all the different apparatus, are preferably assembled together and tied with waxed string to form the bus leads 174, the rigidity of the wires themselves when so assembled, serving to support the bus in a predetermined position, and the rigidity of the leads 172, 173 from the resistance spools to the bus is sufficient to hold the resistance spools in their sockets 168.

The bus itself is supported in place through the rigidity of other leads extending to the various instruments, switches, etc., and thus it is unnecessary to secure all of the many resistance spools to the panel by means of screw bolts, and a great deal of labor has been eliminated through the use of the supporting strip with sockets for spools. At the same time, all of the apparatus is systematically disposed and there is no possibility of the movement of wires across each other which might cause short circuit or damage to the insulation.

Referring to Fig. 2, it will be noted that the lower side of the panel is provided with a relatively thick body 175 located beneath the sockets 110, 111. The body 175 is likewise formed with the sockets 150 for receiving similar jack springs adapted to serve as contacts for these two sockets. A pair of insulating plates 176, 177 cover the jack springs of the sockets and are secured in place by screw bolts 178 threaded into the threaded metallic members 179 which are embedded in the panel. This eliminates the necessity for the manufacture of separate sockets or attachment of separate sockets to a panel, all of which would involve additional expense and labor and the use of the same type of jack contacts for a multiplicity of different functions effects a considerable saving in the cost of the tester.

The lower side of the panel supports the switches 81, 82, 83, as well as a rheostat 180 and a current transformer 181. The current transformer comprises a multiplicity of laminations 182, 183 of substantially E shape which have their legs alternately extending in opposite directions in order to build up a shell type core.

The center leg 184 of the core is provided with the current transformer primary and secondary windings 185, which may be a finished coil wrapped between layers of insulating material, and the coils are assembled with the core by inserting the laminations 182, 183 from each end. The complete transformer 181 is held in assembled relation by a pair of screw bolts 186 threaded into the lugs 126, 127 of the panel and located in grooves 187 in the laminations 182, 183.

Referring to Figs. 6, 7 and 8, these are illustrations of the improved panel with its novel jacks and an improved pin connector. The pin connector 188 is adapted to cooperate with the jacks in such manner that there is practically no possibility of the leads 22, 23 twisting or becoming kinked. Each pin connector 188 may be constructed of a pair of bodies 189, 190 of molded phenolic condensation compound, which form the halves of the complete connector body. The body 189 is identical with the body 190 and is shown in detail in Fig. 7. It may comprise a substantially rectangular molded member of insulating material having a downwardly extending lug 191 at one corner.

The lug 191 is formed with a substantially semicylindrical groove 192 for receiving a complementary cylindrical formation 193 on the pin 164. The pin 164 is also provided with a non-circular or polygonal formation 194 which may be substantially hexagonal in cross-section, and the insulating body 189 is formed with a socket 195 of complementary form so that the pin 164 may be fixedly secured in the pin connector 188 between the two halves 189, 190.

Pin 164 is prevented from rotation by engagement of the hexagonal part 194 in its socket, and it is prevented from reciprocation by the formations 196, 197 above and below the hexagonal portion 194. The hexagonal body 194 of the pin is preferably provided with a circular bore 198 for receiving the exposed end 199 of the metallic conductor of the lead 23 and the twisted wire of the lead, which comprises a multiplicity of fine wires, may be secured in the bore 198 by soldering.

The blocks 189, 190 are also formed with semicylindrical grooves 200 for receiving and protecting the insulating covering of the leads 23 to the point 201, where the leads emerge from the insulating bodies 189, 190. The block 189 is preferably provided with an integral pin 202 and the opposite block with a complementary recess 203 for assuring the registration of the two halves of the insulating body 188. The pin 202 with its socket 203 cooperates with the hexagonal sockets 195 and the hexagonal body 194 to maintain the two halves in registration with each other when they are held together by a rivet 204.

The two halves are each provided with registering cylindrical bores 205 preferably communicating with counterbores 206 at the outside end, and the tubular rivet 204 passes through the bores 205 and is riveted over at 207 in the counterbores 206. The outside of the insulating bodies 188 is preferably provided with horizontally extending ribs 208 to facilitate gripping by the fingers without a possibility of slipping, and the end of the pin 164 is preferably provided with a rounded portion 209. The frusto-conical shoulder 210 between the cylindrical portions 164 and 193 of the pin serves to definitely limit the insertion of the pin into the jack and prevents the pin from going so far as to damage apparatus which might be below the jack under the panel.

For the purpose of external voltage or current tests, and for continuity or resistance tests or any other desirable measurements, the tester is provided with the auxiliary leads 22, 23, each of which terminates in an elongated tubular member 211 of insulating material which acts as a handle for a test probe or pin connector 212. The test pin 212 may be provided with an enlarged cylindrical portion 213, thereby serving as a connector adapted to fit sockets of two different sizes.

The pin connectors 188 and leads 22, 23 are preferably made of different colors, such as red and black, to differentiate between the negative and positive leads, and prevent errors in their use.

Referring to Fig. 6, it will be observed that the pin 164 projects at right angles to the direction of extension of the lead 23 from the body 188. This prevents an abrupt curve in the cable where the pin connector is inserted into a vertically extending jack and the leads generally extend in a horizontal direction and a great deal of wear is prevented on that portion of the leads immediately adjacent the pin. The tendency for the lead wires to be broken in two by the constant bending at that point is eliminated. Furthermore, the pin 164 rotates freely in the jack and permits the lead to extend in any direction without any twisting of the lead, and the present combination is peculiarly adapted to eliminate much of the twisting and wear on the test leads.

Referring to Fig. 4, this is a wiring diagram of a radio set tester constructed according to the present invention. The various electrical devices which have already been described in connection with the structure of the panel have been indicated by the same numerals upon this wiring diagram.

The conductors 50—56 leading to the contacts of the test plug, have been arranged in the form of bus conductors, and indicated by the letters P, G, K, F—, F+, and CG, the meaning of which will be evident from the preceding description. By tracing these conductors, it will be noted that the bus conductors extend directly to the corresponding contacts of the sockets 110, 111, four of the contacts of which are connected in parallel and the control grid bus extends to the control grid jack 25.

When the plug 36 is inserted in the socket of the radio set, the corresponding tube may be placed in either of the sockets 110, 111, and it will be energized from the same sources of energy as it is when the tube is in the radio receiving set. The set may then be operated in a normal manner, but it is preferably operated at maximum volume in order to secure better energization for the purpose of testing, and the exact conditions in the radio set may be ascertained by means of the meters 57, 58, and the rotary selector switches 81, 82, 83.

For the purpose of effecting alternating current measurements, the testing device is provided with the meter 57 and the rotary selector switch 81. The meter is preferably provided with a common terminal 214 and the terminals 215, 216 to be used for different ranges of the meter.

The terminals of the meter are preferably connected by conductors 217 and 218 to two of the movable arms 220, 221 of the switch 81. The third movable arm 222 is connected to terminal 216 through conductor 219, resistances 223, 224, and conductor 225. The conductor 225 also leads to jack 1, which constitutes the high voltage jack, while conductor 217 is connected to jack 2, and a conductor 226 is connected from a point between resistances 223, 224 to the jack 3.

It will be observed that jack 2 constitutes a common terminal for the meter 57, which may be used with the jacks 1 and 3 for 800 volt AC measurements and 160 volt AC measurements, respectively. In order to permit the measurement of heater or AC filament voltages, the contacts 227, 228 of the first bank position are connected to the filament minus bus 53 by a conductor 229. The conductor 229 may be used as a common lead for the fixed contacts 230, 231, 232, 233, to the negative side of the filament.

The fixed contact 228 is connected through a conductor 234 to the positive filament bus, while fixed contact 235 is connected through a resistance 236 to conductor 234, and thence to the positive filament bus. The first position may thus be used for measuring relatively low heater voltages, such as on the four volt range, while the second position of the switch 81 is adapted to be used to measure relatively larger heater voltages, such as the eight volt range through the use of the multiplying resistor 236.

The switch 81 is provided with an off position at the top and a horizontal off position in Fig. 4, but these auxiliary contacts may be used by the manufacturer or owner of the instrument to adapt the instrument to the measurement of filament voltages of different values, should tubes be developed requiring higher or lower filament voltages, thereby maintaining the instrument up to date at all times.

The contacts 232, 237 are used for measurement of the PH voltage, that is, from the plate to the negative side of the filament, and consequently contact 237 is connected by conductor 238 to the plate bus 50. The contacts 233, 239 are utilized for measuring the GH voltage, that is, from the grid to the negative side of the filament, and consequently contact 239 is connected by a conductor 240 to the grid bus 52.

It will be noted also that contacts 232 and 239 are located in the outer circle of contacts so that in these higher measurements, the switch arms 220 and 222 are used, the switch arm 222 being connected through conductor 225 and resistances 223 and 224 to the high voltage range of meter 57. The resistances 223, 224, are of such value that the voltmeter 57 is adapted to measure voltages up to 800 volts for the purpose of determining plate and grid voltage.

The same AC meter 57 may also be utilized for current measurements in milliamperes, by means of the use of a current transformer 181. The terminals of the current transformer secondary 241 are connected by conductors 242, 243 to fixed contacts 244, 245, which correspond to the "AMPS." position of switch 81. The fixed contacts 244, 245 are adapted to cooperate with switch arms 220, 221, which are connected to the low voltage range of alternating current meter 57 and the current produced by the secondary winding 241 is proportional to the current through the primary winding 246.

The primary winding 246 has a relatively low number of turns and is adapted to be placed in series with any external circuit, the current of which is to be measured, through the jacks 5 and 6, which are connected by conductors 247, 248, to the terminals of primary winding 246. The jacks 5 and 6 may be used for the four ampere alternating current range of the meter 57, and the jacks 6 and 7 may be used for the eight ampere range.

The jack 7 is connected by a conductor 249 to an auxiliary tap leading from the primary winding 246. Since the connection through jacks 6 and 7 does not utilize so much of the primary winding 246, it is adapted for the higher current range which produces a proportionately lower voltage drop in the primary 246. The characteristics of the current transformer 241 have been made such that the same scale divisions which are utilized for the four and eight volt ranges, are also available for the four and eight ampere ranges.

In order to permit the measurement of relatively low values of alternating current, the jack 4 is connected by conductor 250, to conductor 217, which leads to the common meter terminal 214. The jack 5 is connected by conductor 251 to conductor 219 leading to the terminal 216 of the meter 57. The terminals 214 and 216 correspond to the 0–20 scale on the meter, and the meter is calibrated to measure alternating currents up to 20 milliamperes on this scale. The upper scale of the meter is also provided with indicia for the 0–100 range, and the jacks 9 and 10 are connected by conductors 252, 253, directly to the filament bus bars 53, 54, so that when the switch 81 is in position to measure AC filament voltages at contacts 230, 235, the jacks 9 and 10 are connected to the meter 57. That is, the eight volt HH position is also used for 100 milliampere range alternating current measurements.

It will thus be observed that the same AC meter may be used for a considerable number of different alternating current measurements of either current or voltage of very low range and relatively high range, and the use of a single meter with the current transformer and rotary selector switch for all of these purposes greatly decreases the cost of the instrument and increases its range of usefulness. By means of the jacks, every range of the meter may be also utilized for external circuits as well as measurements with the test plug 36.

In order that various measurements may be accomplished while a radio receiving set is under operation, without breaking the circuit, the bus conductors 50–56 are provided with a multiplicity of resistance elements through which the drop in voltage may be measured and the current thus determined. Thus, the plate bus 50 is provided with resistances 254, 255, 256. The grid bus is provided with resistances 257, 258, 259. The control grid bus 55 is provided with resistance 260 and the cathode bus 52 is provided with resistance 261.

The terminals 262 and 263 are the negative and positive terminals respectively, of the direct current milliammeter 58, which is fundamentally the same as a DC voltmeter. These terminals are connected by conductors 264, 265 to the contacts 266, 267 of the reversing switch 92. Conductor 264 is also connected to contact 268.

The movable contacts 269, 270 of the reversing switch 92 are connected to the movable switch arms 271, 272, and the movable contacts 269, 270 are joined by a block of insulation 273 for actuation by the same push button 91. Contacts 268 and 269 are normally engaged while contacts 266 and 270 are normally engaged, thereby connecting the DC meter 58 to the switch arms 271, 272, but when the push button 91 is actuated, contact is broken between contacts 268, 269 and between contacts 266, 270, while contact is made between contacts 269 and 266, and between contacts 270 and 267, thus reversing the connection of the meter to the switch arms.

The switch arms 271, 272 are utilized for connection to a multiplicity of different bank contacts for the measurement of DC voltage and current in the circuits of the radio receiving set or in external circuits, and it will thus be evident that in any case, should the meter read backward, the push button 91 may be actuated to cause the meter to read forward. The meter will thus read any voltage or current in circuit regardless of the polarity of that portion of the circuit.

The various positions of the switch 92 have already been given in detail, and the corresponding indicia appears on the wiring diagram of Fig. 4. The off position of the switch may correspond to contacts at the bottom, which are not connected to any part of the circuit, as shown in the switch position of Fig. 4.

The first two contacts indicated by RC are the contacts utilized for resistance and continuity measurements, and these contacts are connected by conductors 274, 275 to the jacks 19–21. The conductor 274 leads to a resistance 276 which is connected to jack 21. Conductor 275 is connected to resistance 277, which is in turn connected to jack 19 through conductor 278, and to resistance 279. Resistance 279 is connected through resistance 280 to conductor 274, and the resistances 279 and 280 are both connected through resistance 281 to jack 20.

These resistances are utilized for adapting the meter 58 to the measurement of low resistance, medium resistance, and high resistance, as indicated at the jacks 19–21. The conductor 274 is also connected by conductor 282 through a resistance 283 to the resistance 284 of a rheostat 180, which is termed an ohmmeter adjuster on the diagram. The movable contact arm 285 of the ohmmeter adjuster is connected by conductor 286 to the positive terminal of a battery 98, while the negative terminal of the battery is connected through conductor 288 to the negative jack 18.

It will thus be noted that the ohmmeter adjuster is shunted across the meter 58 and energized by the battery 98 when the switch 92 is in the resistance-continuity position. The 0–1000 resistance scale on the meter 58 is so calibrated that when the rheostat is adjusted to give full scale deflection with the particular jacks short-circuited, the meter is calibrated to indicate the resistance of any element which may later be connected in series with those jacks.

When the resistance to be measured is connected between the jacks 18 and 20, the medium range of the ohmmeter is used and the reading is multiplied by 10, but when the negative jack 18 and the high resistance jack 21 are used, the resistance meter reading is multiplied by 100. The ohmmeter adjuster 180 effectively serves to adjust the sensitivity of the meter to the electromotive force employed. The adjustment is accomplished by inserting appropriate leads in the desired resistance range jacks and short-circuiting the ends of the leads. This causes voltage to be impressed upon the meter 58 shunted by the rheostat 180, and resistance 283, and the ohmmeter adjuster should then be adjusted until the needle reads on zero.

Th principle of the ohmmeter is best explained on a ratio basis. For instance, if the external resistance is equal to the meter resistance, irrespective of the meter sensitivity and battery voltage, then the meter will indicate just half what it would without said external resistance in the circuit. Proportional readings will be had throughout the scale on this basis.

The reading should be made upon the range which gives the best deflection and the same arrangement and jacks may be used for continuity measurements, since the meter is shunted across the battery and the continuity leads may be short-circuited or connected to any part of the circuit to indicate continuity or measure resistance.

Since the dry batteries employed sometimes depreciate a certain amount, the use of the ohmmeter adjuster permits a dry battery to be used for a longer time, because the ohmmeter adjuster effects the adjustment of meter sensitivity to match the battery voltage. Such measurements, however, usually take only a very small amount of current, and a dry cell may be utilized for a reasonable length of time without replacement.

The same standard cell 98 is also employed for placing an additional predetermined increment of voltage on the grid of an ordinary audion tube or on the control grid of a screen grid tube, and for this purpose, the leads 288, 286 are connected by conductors 289, 290 to the movable contact arms 291, 292 of the tube test switch 83.

The resistance 259 in the grid bus 51 has its ends connected by conductors 293, 294 to the fixed contacts 295, 296 of the normal grid position. When the switch 83 is in this position, the standard cell 98 is connected across the resistance 259 in such manner as to produce a difference in potential in this resistance on account of the RI drop.

This difference in potential causes a change in grid voltage on the grid of the tube in the sockets 110, 111, and the change in grid voltage causes a corresponding change in plate current, which is a measure of the worth of the tube. The change in plate current is compared with standard tables which are furnished with the instruments, giving the proper change in correct current for such a grid test on any tube, and the present device is thus adapted to indicate the value of the tube through a test of its amplifying characteristic.

In a similar manner, the control grid contacts of switch 83 are connected by conductors 297, 298 to the resistance 260, which is in the control grid bus 55, and when a screen grid tube is under test, the switch 83 should be turned to the control grid position to impress an additional increment of voltage on its control grid in effecting the tube test. Each of these tests may be accomplished without breaking the operating circuit of the radio receiving set, the tube of which is operating in the socket 110 or 111 of the testing device.

The jack 8 is a jack intended to be utilized with an appropriate lead for connection to the pentode lead in the radio receiving set, and this jack is connected by means of a conductor 301 which also constitutes a pentode bus and which is connected to the PG or pentode grid jack 24. In some embodiments of the invention, these two jacks may be eliminated and the pentode grid directly connected to the circuits of the receiving set with a lead. In the present embodiment, however, the PG jack 24 is used with a short lead for connection to the pentode grid of a pentode tube placed in the socket 110.

The CG bus 55 is connected with resistance 260 and is also connected with the CG jack 25. This jack is used with an appropriate short lead for connection to the control grid connector of a screen grid tube when it is located in the socket of a tester. As previously stated, the connection to the receiving set is made by means of the connector 56 on the test plug 36, which cooperates with the usual lead for a screen grid tube in the receiving set.

The jacks 9–13 are used for connecting the various ranges of the DC meter 58 to external circuits, and the ranges are indicated between the different jacks on the panel. As previously stated, jacks 9 and 10 are connected to the filament or heater bus conductors 53, 54, and the HH or filament contacts on the selector switch 82 are connected by conductors 302, 303 to the filament bus conductors 53, 54. When the switch 82 is in the HH position, the DC meter 58 is connected through the reversing switch 92 to the heater circuit. The resistance 304 is of a suitable size calibrated with the meter 58 on the 12 volt DC range, and consequently the jacks 9 and 10 may be used both for the AC meter and the DC meter.

The KH—60 contacts of the selector switch 82 are connected by conductors 305, and other conductors, to the cathode bus 52 and negative filament bus 53. The outer KH—60 contact circuit may be traced to the negative filament bus 53 through the conductor 306, resistance 307, conductor 308, resistance 309, conductor 310, resistance 304, conductor 302. The values of the resistances 304, 307, and 309, are such that when they are connected in series with the meter 58, readings should be made on the 60 volt scale for relatively low voltages from the cathode to heater.

The KH—300 contacts are likewise connected to the cathode bus and negative filament bus through an additional resistance 311. The value of this multiplying resistance is such that the meter 58 should be read on the 300 volt scale. It should also be noted that these voltage measurements may be made on the meter 58, whether the cathode voltage be positive or negative with respect to the filament, for the reason that the meter may be reversed in connection through the reversing switch 92.

The K—12 m. a. contacts of the selector switch 82 are connected by conductors 312, 313 to the ends of the resistance 261, which is interposed in series with the cathode bus 52. The resistance 261 thus constitutes a shunt for the meter 58, by means of which the cathode current can be read on the 12 milliampere scale, the meter 58 being so calibrated as to read on this scale. The use of the resistance 261 enables the measurement of the cathode current without necessity for breaking the circuit.

The GH—30 contacts of selector switch 82 are connected through leads 314, 315 to the negative filament bus 53 and grid bus 51. The inner GH—30 contact is in series with the resistances 309, 304 which are of such value that when the selector switch is in this position, the meter 58 reads on the 30 volt scale, and is adapted to measure voltages from the grid to the negative side of the heater within that range.

The PH—300 contacts are connected through leads 316, 317 to the negative filament bus 53 and the plate bus 50. This range of the meter utilizes the resistances 311, 309, and 304, as multiplying resistances to enable the measurement of voltages from the plate to the negative side of the heater up to 300 volts.

The GK—12 contacts are connected through leads 317', 318 to the grid bus 51 and to the cathode bus 52 through resistances 319, 320 and lead 312. The resistances 319 and 320 are of such value that the meter 58 indicates voltage from the grid to the cathode on the 12 volt scale when these resistances are in series with the meter.

The GK—60 contacts are connected through leads 321, 317', 315 to the grid bus 51 and leads 322, resistances 323, 324, and lead 312 to the cathode bus 52 for the measurement of grid-cathode voltages on the 60 volt range.

The GK—120 contacts are connected through leads 325, resistances 326, 327, 323, 320, 319, 312, to the cathode bus, and through leads 321, 317', 315 to the grid bus 51 for measurement of grid-cathode voltages up to 120 volts.

All of these voltages may be read directly or reversed in potential, and the voltage should first be tried on the higher range to protect the instrument, but actually measured on the lowest range which can be used without a deflection of more than full scale, so as to secure the maximum accuracy.

The G—12 m. a. contacts are connected by conductors 328, 329 to the ends of resistance 258, which is in series with the grid bus 51, to facilitate the measurement of grid current on the 12 milliampere scale of meter 58.

The CGK—6 contacts are connected by lead 330, to the control grid bus 55 and through conductors 331, 319, 312, to cathode bus 52 for the measurement of voltages from the control grid to the cathode on the 6 volt scale.

The CGK—60 contacts are likewise connected to the control grid bus and cathode bus through the same conductor 330 on one side, and through conductors 332, 322, 324, 323, 320, 319, 312.

The PK—300 contacts are connected to the plate and cathode busses through conductors 333, resistances 334, 326, 327, 323, 320, 319, 312, to cathode bus 52 and through conductor 335 to plate bus 50, for measurement of voltage from a plate to cathode on a 300 volt scale.

The P—12 m. a. contacts are connected through the same circuit to the cathode bus 52, and through the same circuit to the plate bus 50 with an additional multiplying resistance 336 for measurement of plate-cathode voltages on the 600 volt scale.

It should be noted that these switch positions may be used for measurement of the voltage to the negative side of the filament when the adapter 37 is used for the reason that the cathode is then tied to the negative side of the filament through a connection in the adapter 37.

The P—12 m. a. contacts are connected through conductor 335 to one side of the resistances 254—256 in the plate bus 50. These resistances may constitute shunts for the DC milliammeter 58 by means of which the plate current may be measured and indicated on the 12 milliampere scale of the meter.

The P—60 m. a. contacts are likewise connected by means of additional conductor 338 across the resistance shunts 254, 255 for measurement of the plate current on the 60 milliampere scale, and the P—120 m. a. contacts utilize the conductor 339 and resistant shunt 254 for measurement of plate current on the 120 milliampere scale.

The G—120 m. a. contacts are connected by conductor 340 to one end of the resistance 257 and through conductors 341, 329 to the other end of resistance 257. The resistance 257 constitutes a shunt in the grid bus 51 whereby meter 58 is adapted to measure the plate current in the second plate of a rectifier tube on the 120 milliampere scale. The second plate of a full wave rectifier tube such as the '80 rectifier tube, is connected to the same prong or terminal ordinarily used for the grid. The connection to the grid circuit may thus be used when testing a full wave rectifier tube to measure current in the other plate circuit.

In the case of a tetrode and a pentode tube, the grid current is of interest in the analysis of the radio receiving set and comparison of the grid current with the standards for that set, affords an indication of the conditions in the set.

It should be understood that a manual is provided with the testing device, which sets forth the connection of the various elements to the standard tube contacts in various types of tubes, so that although the use of the prongs for various elements will vary in different types of tubes, a serviceman with an understanding of the connection of the elements of the tube to the prongs may utilize the present switching device for testing any kind of tube. The present indicia is therefore exemplary of indicia which may be used for the types of tubes now in use, and different indicia would be used for new tubes which may be developed.

The PGK—30 contacts are connected to the pentode grid bus 301 through the conductor 342 and to the cathode bus 52. The connection to the cathode bus may be traced as follows: 343, 327, 323, 320, 319, 312, 52.

It will thus be observed that the selector switch 82 may be utilized with the meters for the measurement of the voltage between any of the electrodes of the tube in the radio receiving set with U Y heater type triode tubes. Where grid voltage is measured to the cathode, the grid cathode voltage reading should correspond to the cathode heater reading, since in general, the grid lead and the center tap of the heater winding are both common to the chassis. This provides an excellent check on the resistances and circuit continuity of the heater center tap connection to ground on this type of receiver.

The output contacts of the selector switch 82 are connected by conductors 344, 345 to the points 346, 347 of a rectifier unit. The rectifier unit comprises four copper oxide rectifiers 348, 349, 350, 351, which are connected in such manner as to rectify both half waves of alternating current passing through the unit. The copper oxide rectifier discs 348, 349 are oppositely connected by the conductor 352 between the points 346 and 347, while the copper oxide rectifier discs 350, 351 are oppositely connected by the conductor 353 between the points 346 and 347.

The jack 14 is connected by conductor 354 to the point 355 between the rectifier discs 348, 349 and jack 15 is connected to the point 356 between rectifier discs 350, 351.

The present rectifier unit is adapted to rectify an alternating current component impressed on the jacks 14 and 15 through appropriate leads, and the resulting direct current passing through the leads 344 and 345 is measured by the DC meter 58 which is calibrated to approximately 1, 10 and 50 volts full scale sine wave, 60 cycles. The operation of this ouput meter is as follows:

When an alternating current source is connected to the terminals of the rectifying unit, assuming that a positive half wave of current is impressed on the terminal 14, at one instant, this current would pass through conductors 354, 355, 352, 348, 345, to the meter, returning through 344, 347, 351, 356, 15. The next half wave would be opposite in direction and it would pass through the following circuit from the jacks to the meter: 15, 356, 353, 350, 346, 345 to the meter, returning through 344, 347, 349, 355, 354, 14.

It will be observed that the unit provides a direct current circuit for each half wave of the alternating current and the alternating current is rectified or turned into a direct current for measurement by the DC meter 58. It should be noted that a copper oxide rectifier would be damaged by the application of direct current, and the low and medium ranges of the output meter should be used only across speaker output transformers, voice coils, or transmission line transformers, which do not maintain any DC potential across the windings being tested. The jack 16 is connected to the point 353, through conductor 357 and multiplying resistance 358, to provide a medium range for the output meter calibrated on ten volts full scale.

The jack 17 is connected to the point 353 of the rectifying unit through resistances 358, 359, lead 360, condenser 361 and lead 362 to provide a high range for the output meter calibrated at 50 volts full scale, and adapted to be used where it is not convenient to connect the low or medium ranges across the voice coil of the speaker.

This condenser is, of course, used only when taking an output reading from an output tube plate to ground, and is to filter out the direct current.

Referring to Fig. 11, this is a view in perspective of a flat fiber adapter which is furnished with the testing device for use with an output tube. The fiber adapter comprises a relatively flat insulating base 363 of thin insulating material, which is provided with an aperture 364 for passing two of the tube prongs and with apertures 365, 366, for receiving the plate and positive filament prong, respectively. The aperture 366 is provided with a tubular rivet 367 and an aperture 365 with a tubular rivet 368, the latter of which is adapted to engage and substantially fit the plate prong of the tube. A flat strip of metal 369 provided with a connector 370 provides a convenient connection to the plate prong of the tube when the flat adapter is used, and this terminal may be connected to the high output jack 17 by appropriate leads. Common output jack 14 may be connected to the chassis of the receiver to measure the output and the condenser 361 protects the instrument against damage by the high DC plate voltage of the tube.

The low and medium ranges of the output meter may be used for testing power pack or filter units for ripple or hum voltage with a 2 microfarad condenser connected in series with one of the leads to protect the instrument from the DC voltage. This enables the serviceman to detect any abnormal hum voltage in the power pack filter system, and thus locate defective choke coils, open filter condensers, etc.

It is always advisable to have an insulating condenser in series with the output meter because there is always a slight difference in DC potential between two tube plates, and different direct current would cause a fictitious and meaningless reading to be indicated on the output meter if the condenser were not placed in circuit. The output meter may also be used in conjunction with a modulated oscillator or a signal generator in balancing or neutralizing radio receivers and in peaking intermediate frequency transformers.

Referring again to Fig. 1, the tester panel is preferably provided with a pair of binding posts 400, 401 with suitable indicia, such as 1MA on the panel between them for the purpose of effecting current measurements within this range and also for the special purpose of measuring the light intensity of television apparatus.

Referring to Fig. 4, the binding post 400 may be connected by a connector 402 to a conductor 265, and the binding post 401 may be connected by a connector 403 to the conductor 264. The member 406 comprises an auxiliary piece of apparatus having leads 404, 405 for connection with the binding posts 401. The member 406 preferably consists of a photo-electric cell of the type adapted to generate an electro-motive force when light is received upon the elements of the cell, the intensity of the light bearing a relation to the electromotive force generated or to the current in the leads 404, 405.

The photo-electric cell in question is made the subject of a separate application owned by the company of which the assignee of this application is a subsidiary, and reference may be made to such application for a more detailed description. The purpose of the auxiliary apparatus is to provide the testing instrument with means for measuring the illumination of a television screen. The illumination may, for example, be the result of a cathode ray striking a screen covered with Willemite or some other fluorescent material such as calcium tungstate. A measure of the intensity of the illumination of the screen is desirable for the purpose of checking the efficiency and operation of the television receiver, but ordinary photo-electric cells require a number of sources of voltage and an amplifier, while the present photo-electric cell indicates directly upon the direct current instrument, and is therefore much more simple and advantageous for this purpose. The cell 406 may be exposed to the light or to the screen at a predetermined distance from the light, and the indications on the instrument will be a measure of the light intensity of the screen. The measurements should preferably be made with no modulation in the circuit in order to secure full intensity, although other tests may be made with forms of modulation, if desired.

The present testing device is thus adapted to be used for testing all types of modern radio receivers, amplifying apparatus, tubes, circuits, and television. The arrangement is such that with only two meters, alternating current and direct current voltages and currents may be measured, and the voltage conditions may be determined in all of the circuits of a radio receiving set. Current conditions may be measured in all of the circuits which show an appreciable current, or in which it may be desirable to measure the current to analyze the set, and continuity and resistance tests may be made by the same testing device. By means of capacity curves of the type covered by prior applications, the same meters are also used for measuring capacity and the output of a radio receiving set is also measured to give an indication of its efficiency or to effect a measurement of alternating current components in various circuits.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a testing device, the combination of a molded supporting panel with an electrical instrument movement, said panel being formed with an aperture and with an integral, backwardly extending wall forming a casing for the movement, a transparent cover for said opening, and a rear cover plate engaging the rear of said wall for completing the instrument casing.

2. In a testing device, the combination of a molded supporting panel with an electrical instrument movement, said panel being formed with an aperture and with an integral, backwardly extending wall forming a casing for the movement, a transparent cover for said opening, a rear cover plate engaging the rear of said wall for completing the instrument casing, said molded panel having an integral, rearwardly extending wall forming a socket, and a standard cell in said socket for energizing said electrical instrument.

RAY SIMPSON.